(12) United States Patent
Wang et al.

(10) Patent No.: US 11,148,137 B2
(45) Date of Patent: Oct. 19, 2021

(54) RESERVOIR CHIP AND METHOD FOR PRODUCING THE SAME

(71) Applicant: Tsinghua University, Beijing (CN)

(72) Inventors: Moran Wang, Beijing (CN); Wenhai Lei, Beijing (CN); Tong Liu, Beijing (CN); Guang Yang, Beijing (CN)

(73) Assignee: Tsinghua University, Beijing (CN)

( * ) Notice: Subject to any disclaimer, the term of this patent is extended or adjusted under 35 U.S.C. 154(b) by 187 days.

(21) Appl. No.: 16/662,620

(22) Filed: Oct. 24, 2019

(65) Prior Publication Data
US 2021/0001332 A1    Jan. 7, 2021

(30) Foreign Application Priority Data
Jul. 3, 2019 (CN) .......................... 201910596301.8

(51) Int. Cl.
*B01L 3/00* (2006.01)
*E21B 49/00* (2006.01)
*G06T 17/05* (2011.01)

(52) U.S. Cl.
CPC ........ *B01L 3/502707* (2013.01); *E21B 49/00* (2013.01); *G06T 17/05* (2013.01);
(Continued)

(58) Field of Classification Search
CPC ........... B23Q 2220/008; B01L 2200/12; B01L 2300/0816; B01L 3/502707; E21B 49/00; G06T 17/05; G06T 2200/08
See application file for complete search history.

(56) References Cited

U.S. PATENT DOCUMENTS

2018/0296950 A1    10/2018    Yang

FOREIGN PATENT DOCUMENTS

| CN | 101661514 A | 3/2010 |
| CN | 108446788 A | 8/2011 |

(Continued)

OTHER PUBLICATIONS

"Reservoir-on-a-Chip (ROC): A new paradigm in reservoir engineering-",Gunda, Naga Siva Kumar; Bera, Bijoyendra; Karadimitriou, Nikolaos K.; et al. Lab on a chip, vol. 11, No. 22, p. 3785-3792, Sep. 2011. (Year: 2011).*

(Continued)

*Primary Examiner* — Jennifer Wecker
(74) *Attorney, Agent, or Firm* — Thomas | Horstemeyer, LLP

(57) ABSTRACT

The application relates to a reservoir chip and a method for producing the same. The method includes: scanning a three-dimensional structure of a real oil reservoir core and reconstructing the three-dimensional structure, extracting pore size distribution characteristics, analyzing formation of a pore structure of the real oil reservoir core and accumulation morphology of rock particles, extracting the morphology of main large particles in the rock particles and establishing a large particle morphology database; distributing and projecting particles in a porous medium of the reservoir chip, to obtain a picture of the reservoir chip structure; importing the picture into a drawing software, and drawing import and export regions of the reservoir chip structure to obtain a design drawing of the reservoir chip; and making the design drawing etched on a substrate and bonded with a heat-resistant glass anode to obtain the reservoir chip.

18 Claims, 3 Drawing Sheets

(52) U.S. Cl.
CPC ... *B01L 2200/12* (2013.01); *B01L 2300/0816* (2013.01); *G06T 2200/08* (2013.01)

(56) References Cited

FOREIGN PATENT DOCUMENTS

| | | |
|---|---|---|
| CN | 102930345 A | 2/2013 |
| CN | 108195647 A | 6/2018 |
| CN | 102146788 A | 8/2018 |
| CN | 108802073 A | 11/2018 |
| CN | 109025983 A | 12/2018 |
| CN | 109162681 A | 1/2019 |
| CN | 109697752 A | 4/2019 |
| GB | 2481927 A | 1/2012 |

OTHER PUBLICATIONS

First Office Action for Chinese Application No. 201910596301.8 dated Mar. 18, 2020.

"Reservoir-on-a-Chip (ROC): A new paradigm in reservoir engineering-", Gunda, Naga Siva Kumar; Bera, Bijoyendra; Karadimitriou, Nikolaos K.; et al. Lab on a chip, vol. 11, No. 22, p. 3785-3792, Dec. 31, 2020.

\* cited by examiner

RESERVOIR CHIP AND METHOD FOR PRODUCING THE SAME

CROSS-REFERENCE TO RELATED APPLICATION

This application claims priority to patent application number 2019105963018 filed in China on Jul. 3, 2017, the entire contents of which are hereby incorporated by reference.

TECHNICAL FIELD

The application relates to, but is not limited to, the field of exploration, development and utilization of petroleum and natural gas, in particular to, but not limited to, a reservoir chip and a method for producing the same.

BACKGROUND

Oil and gas resources have always been the lifeblood of China's energy security, and their output needs to be steadily increased. Enhanced oil recovery (EOR) is an important means to steadily increase the output of oil and gas resources. However, the EOR mechanism, especially the transport of multiphase flow in a complex porous medium, is not very clear, which seriously limits the development and application of related EOR technologies and methods.

With developments of microchips, microfluidics or micromodel provides a powerful tool to study the pore-scale multiphase flow and EOR mechanisms. Compared with the coreflooding experiments, microfluidics has significant advantages in visualization, controllability, and repeatability. More importantly, visualized microfluidics experimental results can be compared with numerical simulation results directly, which could make up disadvantages of microfluidics in 3D geometry and further expands the space for the study of the pore-scale multiphase flow and EOR mechanisms. In the microfluidics experiments, the most important thing is to design microchips with the most important statistical information of concerned reservoir geometries, so that a two-dimensional chip structure can represent some structural characteristics of a real core. The current microfluidic structure design is generally artificial geometries, such as array structure, to present special pores features but does not have the important statistical information of a real core. Some chips with complex geometries were designed based on scanned images of a sliced real rock. Such image based geometries made the chips appear more realistic, yet the similarity of pore connectivity was not seriously proved with real rocks which actually influences significantly the permeability, phase distribution and interaction of fluids. Therefore, the current reservoir chip design ignores many important characteristics of a real core structure, which severely restricts the authenticity of experiments and the research and development of EOR technology.

SUMMARY

The following is an overview of the topics described in detail herein. This summary is not intended to limit the scope of protection of the claims.

The application provides a reservoir chip and a method for producing the same. The reservoir chip can ensure the main statistical structural characteristics of real cores to the greatest extent, and lays a solid physical foundation for subsequent microfluidic experiments to study the multiphase flow and EOR mechanism in a porous medium.

Specifically, the application provides a method for producing a reservoir chip including:

(1) selecting a real oil reservoir core and scanning a three-dimensional structure of the real oil reservoir core:

(2) reconstructing the three-dimensional structure of the real oil reservoir core obtained by scanning, and extracting pore size distribution characteristics;

(3) analyzing formation of a pore structure of the real oil reservoir core and accumulation morphology of rock particles according to the pore size distribution characteristics that are obtained, extracting morphology of main large particles in the rock particles, and establishing a large particle morphology database;

(4) randomly selecting large particles from the large particle morphology database, and randomly distributing and projecting the selected large particles in a region of a porous medium of the reservoir chip;

(5) randomly growing small particles in a remaining region of the porous medium until pore size distribution of a generated reservoir chip structure is similar to pore size distribution of the real oil reservoir core, to obtain a picture of the reservoir chip structure;

(6) importing the picture of the reservoir chip structure into a drawing software, and drawing import and export regions of the reservoir chip structure in the drawing software, to obtain a design drawing of the reservoir chip; and (7) making the design drawing of the reservoir chip etched on a substrate and bonded with a heat-resistant glass anode punched at an upstream and a downstream to obtain the reservoir chip.

In this application, the term "real oil reservoir core" is defined as a core taken from a formation.

It should be understood that depending on different purposes of researches, types of rocks are different, and sizes of large particles are selected differently. For example, particles with a volume accounting for 0.5% or more of the volume of the whole rock solid matrix can be initially selected as large particles, and the size of large particles selected within the above range has little influence on the statistical information of the final structure of the method of the application. In an embodiment of the application, particles with a volume accounting for 1% or more, 2% or more, or 3% or more of the volume of the whole rock solid matrix can be selected as large particles.

In this application, when the average pore diameter in the generated reservoir chip structure is within the range of 0.5 to 5 times of the average pore diameter of the real core, it can be considered that the pore size of the generated reservoir chip structure can represent the pore size of the real oil reservoir, and when the pore size distribution of the generated reservoir chip structure is similar to the pore size distribution form of the real oil reservoir core, it can be considered that the pore size distribution characteristics of the generated reservoir chip can represent the pore size distribution characteristics of the real oil reservoir, and the reservoir chip structure at this time can represent the main structural characteristics of the real oil reservoir core.

In this application, "small particles" refers to the most basic unit for generating rock matrix, and its size should not be greater than $\frac{1}{10}$ of the projection pixel of the smallest large particle in the large particle morphology database. The size of small particles selected within the above range has little influence on the statistical information of the final structure of the method of this application. In an embodiment of the application, for the case of a region of the porous medium of 3000×4000 pixel points, particles with the size of 20 pixel points can be selected as small particles to ensure that the small particles can accumulate to form the statistical characteristics of the desired structure.

In an embodiment of the application, it is possible to select particles with suitable size in the rock particles as "small particles" directly, or to form "small particles" by stacking particles smaller than "small particles".

In an embodiment of the application, in step (1), the scanning a three-dimensional structure can be performed by using electronic computerized tomography (CT), a focused ion beam-scanning electron microscope (FIB-FEM) or a nuclear magnetic resonance imaging technology (MRI).

In an embodiment of the application, in step (4), the randomly selecting large particles from the large particle morphology database and randomly distributing and projecting the selected large particles in a region of a porous medium of the reservoir chip can be performed by using a Quartet Structure Generation Set (QSGS).

In an embodiment of the application, in step (5), the randomly growing small particles in a remaining region of the porous medium can be performed by using a Quartet Structure Generation Set.

In an embodiment of the application, in step (6), the importing the picture of the reservoir chip structure into a drawing software can be performed by using an LISP (list procession language) programming In an embodiment of this application, the drawing software can be AutoCAD or L-Edit.

In an embodiment of the application, in step (7), the making the design drawing of the reservoir chip etched on a substrate can be performed by using a standard photolithography method and an inductively coupled plasma deep reactive ion etching (ICP-DRIE) method, or a standard photolithography method and a wet etching technology.

In an embodiment of the application, the substrate may be a silicon wafer, a glass sheet, a polydimethylsiloxane (PDMS) sheet, or a polymethylmethacrylate (PMMA) sheet.

The application also provides a reservoir chip produced by the production method described above.

The method for producing the reservoir chip of the application is based on the structural characteristics of real cores, generates similar reservoir chips by using a random algorithm, and processes the reservoir chips by using microelectronic processing technology to obtain the final reservoir chips. The reservoir chip can ensure the main structural characteristics of real cores to the greatest extent, and lays a solid physical foundation for subsequent microfluidic experiments to study the multiphase flow mechanism and the enhanced oil recovery mechanism in a porous medium.

Other features and advantages of this application will be set forth the following description, and partly become apparent from the description, or be understood by implementing the invention. Other advantages of the application can be realized and obtained through the schemes described in the specification, claims and drawings.

BRIEF DESCRIPTION OF DRAWINGS

Drawings are for understanding of the technical schemes of the application and constitute a part of the description, are used for explaining the technical schemes of the application in combination with the embodiments of the application, not for limit the technical schemes of the application.

DETAILED DESCRIPTION

Figure 1:
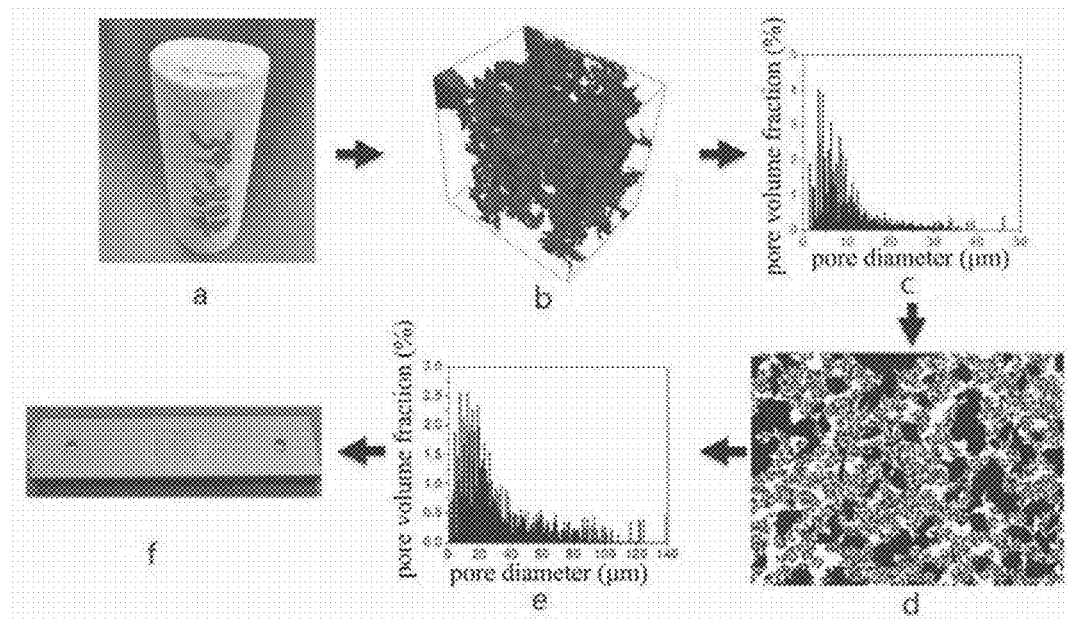
FIG. 1 is a design flow chart of a method for producing a reservoir chip according to an example of the application.

In order to make the object, technical scheme and advantages of this application more clear, examples of this application will be described in detail below with reference to the accompanying drawings. It should be noted that Examples in this application and the features in the Examples can be combined with each other arbitrarily without conflict.

An Example of the application provides a method for producing a reservoir chip including:

(1) selecting a real oil reservoir core and scanning a three-dimensional structure of the real oil reservoir core;

(2) reconstructing the three-dimensional structure of the real oil reservoir core obtained by scanning, and extracting pore size distribution characteristics;

(3) analyzing formation of a pore structure of the real oil reservoir core and accumulation morphology of rock particles according to the pore size distribution characteristics that are obtained, extracting morphology of main large particles in the rock particles, and establishing a large particle morphology database;

(4) randomly selecting large particles from the large particle morphology database, and randomly distributing and projecting the selected large particles in a target region of a porous medium of the reservoir chip;

(5) randomly growing small particles in a remaining region of the porous medium until pore size distribution of a generated reservoir chip structure is similar to pore size distribution of the real oil reservoir core, to obtain a picture of the reservoir chip structure;

(6) importing the picture of the reservoir chip structure into a drawing software, and drawing import and export regions of the reservoir chip structure in the drawing software, to obtain a design drawing of the reservoir chip; and (7) making the design drawing of the reservoir chip etched on a substrate and bonded with a heat-resistant glass anode punched at an upstream and a downstream to obtain the reservoir chip.

In an example of the application, in step (1), the scanning a three-dimensional structure can be performed by using electronic computerized tomography, a focused ion beam-scanning electron microscope or a nuclear magnetic resonance imaging technology.

In an example of the application, in step (2), the reconstructing the three-dimensional structure of the real oil reservoir core obtained by the scanning can be performed by using softwares such as matlab or imageJ.

In an example of the application, in step (2), the extracting pore size distribution characteristics can be performed by using the maximum sphere method.

In an example of the application, in step (4), the randomly selecting large particles from the large particle morphology database and randomly distributing and projecting the selected large particles in a region of a porous medium of the reservoir chip can be performed by using a Quartet Structure Generation Set.

In an example of the application, in step (5), the randomly growing small particles in a remaining region of the porous medium can be performed by using a Quartet Structure Generation Set.

In an example of the application, in step (6), the importing the picture of the reservoir chip structure into a drawing software can be performed by using LISP programming.

In an example of this application, the drawing software can be AutoCAD or L-Edit.

In an example of the application, in step (7), the making the design drawing of the reservoir chip etched on a substrate can be performed by using two steps of a standard photolithography method and an inductively coupled plasma deep reactive ion etching method, or two steps of a standard photolithography method and a wet etching technology.

In an example of the application, the substrate may be a silicon wafer, a glass sheet, a polydimethylsiloxane sheet, or a polymethylmethacrylate sheet.

An example of the application also provides a reservoir chip produced by the production method described above.

Example 1

The application relates to a method for producing a reservoir chip including:

(1) selecting a real oil reservoir core (sandstone as shown in FIG. 1) of Changqing oilfield, and scanning a three-dimensional structure of the real oil reservoir core by using micron CT (as shown in b in FIG. 1);

(2) reconstructing the three-dimensional structure of the real oil reservoir core obtained by scanning, through matlab or imageJ software, and extracting the pore size distribution characteristics by using the maximum sphere method (as shown in c in FIG. 1, the abscissa is the pore diameter μm, and the ordinate is the pore volume fraction %);

(3) analyzing formation of a pore structure of the real oil reservoir core and accumulation morphology of rock particles according to the pore size distribution characteristics that are obtained, extracting morphology of main large particles (referring to particles with a volume accounting for more than 1% of the volume of the whole rock solid matrix) in the rock particles, and establishing a large particle morphology database;

(4) randomly selecting large particles from the large particle morphology database and randomly distributing and projecting the selected large particles in a region of a porous medium of the reservoir chip, through a Quartet Structure Generation Set.

Figure 2:
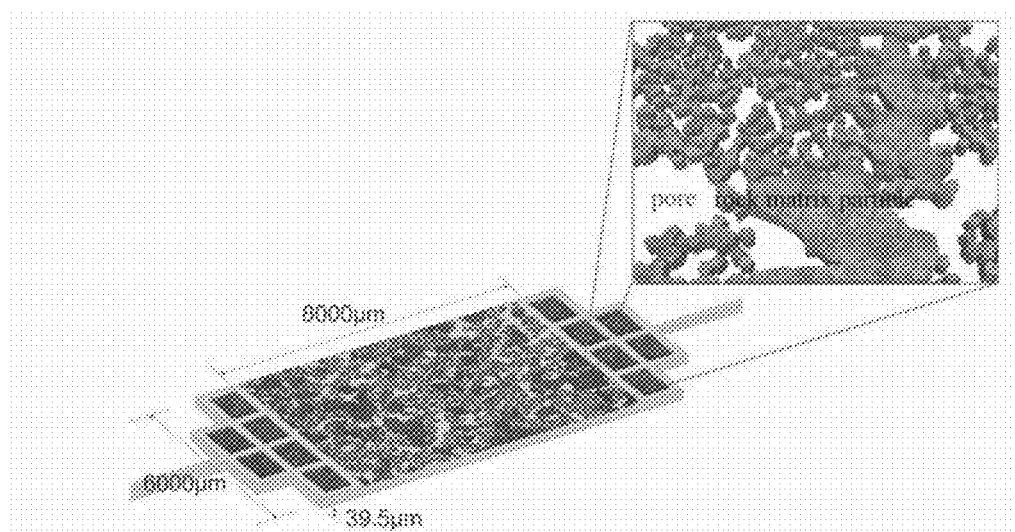
FIG. 2 is a design drawing of the reservoir chip produced in an example of the application.
Figure 3:
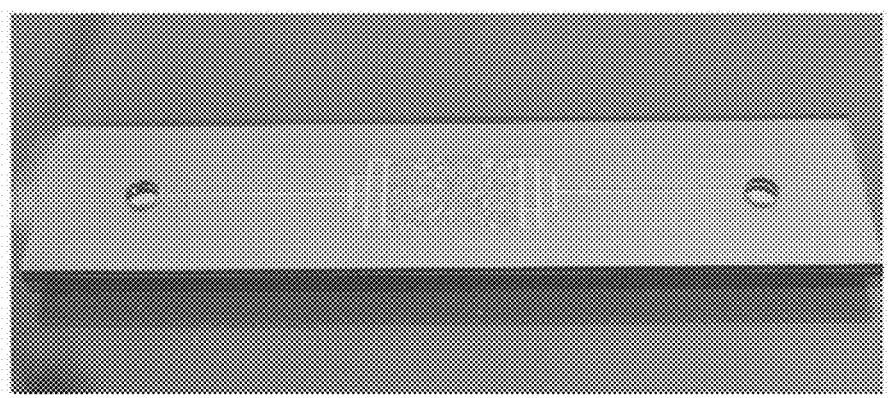
FIG. 3 is a physical diagram of a reservoir chip produced in an example of the application.

(5) randomly growing small particles in a remaining region of the porous medium through a Quartet Structure Generation Set until pore size distribution (as shown in e in FIG. 1, the abscissa is pore diameter μm, and the ordinate is pore volume fraction %) of a generated reservoir chip structure (as shown in d in FIG. 1) is similar to pore size distribution of the real oil reservoir core (the average pore diameter in the generated reservoir chip structure is within the range of 0.5-5 times of the average pore diameter of the real oil reservoir core) to obtain a picture of the reservoir chip structure;

(6) importing the picture of the reservoir chip structure into AutoCAD software by using LISP programming, and drawing import and export regions of the reservoir chip structure in AutoCAD software to obtain a design drawing of the reservoir chip (as shown in FIG. 2); and (7) making the design drawing of the reservoir chip etched on a silicon wafer and bonding with a heat-resistant glass anode punched at an upstream and a downstream to obtain the reservoir chip (as shown in FIG. 1 and FIG. 3 where the reservoir chip has more than $2.8\times10^5$ pores) through a standard photolithography method and an inductively coupled plasma. deep reactive ion etching method.

Comparative Example 1

This comparative example differs from Example 1 only in that steps (3) and (4) are omitted, and small particles are directly randomly distributed in a region and a remaining region of the porous medium of the reservoir chip.

Figure 4:
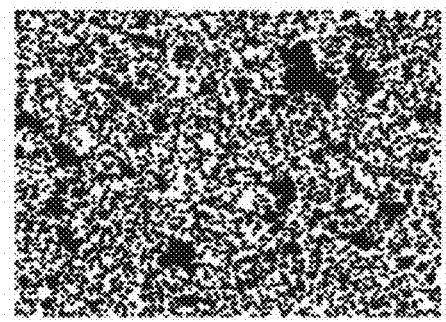
FIG. 4 is a structural diagram of a reservoir chip generated from a single particle in a comparative example of the application.
Figure 5:
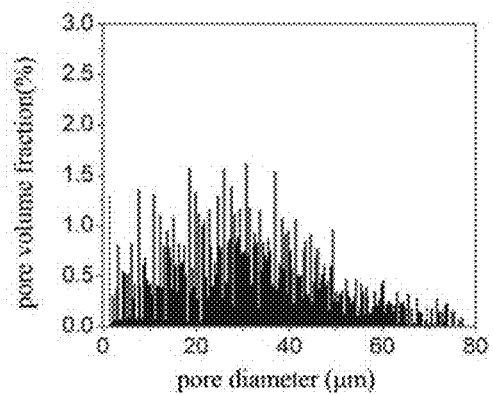
FIG. 5 is a pore size distribution diagram of a reservoir chip generated from a single particle in a comparative example of the application.

The generated reservoir chip structure is shown in FIG. 4, and its pore size distribution is shown in FIG. 5.

As can be seen from FIGS. 4 and 5, the particle size distribution of a reservoir chip formed by a single particle is normal distribution, and its structure cannot represent the main structural characteristics of such real cores.

Figure 6:
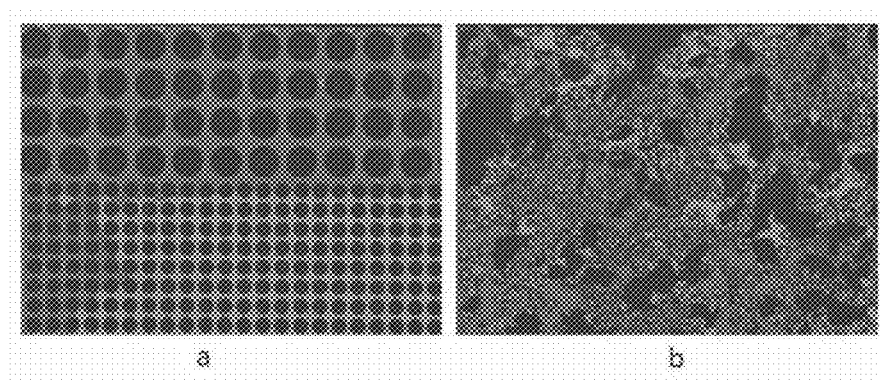
FIG. 6 is an experimental schematic diagram of water flooding of a reservoir chip obtained by using an artificially designed chip structure and a reservoir chip obtained in Example 1 of the application.

FIG. 6 is an experimental schematic diagram of water flooding of a reservoir chip obtained by using an artificially designed chip structure and a reservoir chip obtained in Example 1 of the application, a corresponds to the reservoir chip obtained by using an artificially designed chip structure, and b corresponds to the reservoir chip obtained in Example 1 of the application.

As can be seen from FIG. 6, compared with the reservoir chip obtained by using the artificially designed chip structure, the water flooding experiment conducted by using the reservoir chip obtained in Example 1 of the application can more truly simulate the real distribution of water and oil, indicating that the reservoir chip of the Example of the application can ensure the main structural characteristics of real cores.

The present disclosure is an example of principles of examples of the application, and is not intended to limit the application in any form or substance, or to limit the application to specific embodiments. It is apparent to those skilled in the art that the elements, methods, systems, etc. of the technical solutions of the examples of the application can be varied, changed, modified, and evolved without departing from the principles, spirit, and scope as defined in the claims of the examples and technical solutions of the application as described above. These variations, changes, modifications and evolved embodiments are all included in the equivalent embodiments of this application, and these equivalent embodiments are all included in the scope of this application defined by the claims. Although embodiments of the application may be embodied in many different forms, some embodiments of the application are described in detail herein. In addition, examples of the application include any possible combination of some or all of the various embodiments described herein, and are also included within the scope of the application as defined by the claims. All patents, patent applications and other cited materials mentioned anywhere in this application or in any one of the cited patents, cited patent applications or other cited materials are hereby incorporated by reference in their entirety.

The above disclosure is intended to be illustrative rather than exhaustive. For those skilled in the art, this specification will suggest many variations and alternatives. All such alternatives and variations are intended to be included within the scope of the present claims, wherein the term "including" means "including, but not limited to".

The description of alternative embodiments of the application has been completed herein. Those skilled in the art will recognize other equivalent transformations of the embodiments described herein, which are also encompassed by the claims appended hereto.

What we claim is:

1. A method for producing a reservoir chip, comprising:
   (1) selecting a real oil reservoir core and scanning a three-dimensional structure of the real oil reservoir core;
   (2) reconstructing the three-dimensional structure of the real oil reservoir core obtained by scanning, and extracting pore size distribution characteristics;
   (3) analyzing formation of a pore structure of the real oil reservoir core and accumulation morphology of rock particles according to the pore size distribution characteristics that are obtained, extracting morphology of main large particles in the rock particles, and establishing a large particle morphology database;
   (4) randomly selecting large particles from the large particle morphology database and randomly distributing and projecting the selected large particles in a region of a porous medium of the reservoir chip;
   (5) randomly growing small particles in a remaining region of the porous medium until pore size distribution of a generated reservoir chip structure is similar to pore size distribution of the real oil reservoir core, to obtain a picture of the reservoir chip structure;
   (6) importing the picture of the reservoir chip structure into a drawing software, and drawing import and export regions of the reservoir chip structure in the drawing software, to obtain a design drawing of the reservoir chip; and
   (7) making the design drawing of the reservoir chip etched on a substrate and bonded with a heat-resistant glass anode punched at an upstream and a downstream to obtain the reservoir chip.

2. The method according to claim 1, wherein in step (1), the scanning a three-dimensional structure is performed by using an electronic computerized tomography, a focused ion beam-scanning electron microscope or a nuclear magnetic resonance imaging technology.

3. The method according to claim 1, wherein in step (4), the randomly selecting large particles from the large particle morphology database and randomly distributing and projecting the selected large particles in a region of a porous medium of the reservoir chip are performed by using a Quartet Structure Generation Set.

4. The method according to claim 1, wherein in step (5), the randomly growing small particles in a remaining region of the porous medium is performed by using a Quartet Structure Generation Set.

5. The method according to claim 1, wherein in step (6), the importing the picture of the reservoir chip structure into a drawing software is performed by using LISP programming.

6. The method according to claim 1, wherein the drawing software is AutoCAD or L-Edit.

7. The method according to claim 1, wherein in step (7), the making the design drawing of the reservoir chip etched on a substrate is performed by using a standard photolithography method and an inductively coupled plasma deep reactive ion etching method, or a standard photolithography method and a wet etching technology.

8. The method according to claim 1, wherein the substrate is a silicon wafer, a glass sheet, a polydimethylsiloxane sheet or a polymethylmethacrylate sheet.

9. A reservoir chip produced by the method of claim 1.

10. The method according to claim 5, wherein the drawing software is AutoCAD or L-Edit.

11. The method according to claim 7, wherein the substrate is a. silicon wafer, a glass sheet, a polydimethylsiloxane sheet or a polymethylmethacrylate sheet.

12. A reservoir chip produced by the method of claim 2.
13. A reservoir chip produced by the method of claim 3.
14. A reservoir chip produced by the method of claim 4.
15. A reservoir chip produced by the method of claim 5.
16. A reservoir chip produced by the method of claim 6.
17. A reservoir chip produced by the method of claim 7.
18. A reservoir chip produced by the method of claim 8.

* * * * *